(12) United States Patent
Anderson, Jr.

(10) Patent No.: US 7,216,997 B2
(45) Date of Patent: May 15, 2007

(54) PHOSPHOR REACTIVE INSTRUMENT PANEL AND GAUGES

(75) Inventor: James B. Anderson, Jr., Cookeville, TN (US)

(73) Assignee: Federal-Mogul World Wide, Inc., Southfield, MI (US)

( * ) Notice: Subject to any disclaimer, the term of this patent is extended or adjusted under 35 U.S.C. 154(b) by 0 days.

(21) Appl. No.: 11/257,628

(22) Filed: Oct. 25, 2005

(65) Prior Publication Data
US 2006/0087826 A1    Apr. 27, 2006

Related U.S. Application Data

(60) Provisional application No. 60/622,307, filed on Oct. 26, 2004.

(51) Int. Cl.
*G01D 11/28* (2006.01)

(52) U.S. Cl. ............... 362/27; 362/23; 362/29; 362/30; 362/85

(58) Field of Classification Search ............ 362/23, 362/27, 29, 30, 84, 85
See application file for complete search history.

(56) References Cited

U.S. PATENT DOCUMENTS

| | | | |
|---|---|---|---|
| 4,536,656 A | 8/1985 | Sowa | 250/463.1 |
| 4,841,155 A | 6/1989 | Ushida et al. | 250/463.1 |
| 5,032,711 A | 7/1991 | Yamada | 250/461.1 |
| 5,040,480 A | 8/1991 | Iwazaki et al. | 116/286 |
| 5,044,304 A | 9/1991 | Tomita | 116/286 |
| 5,050,527 A | 9/1991 | Kameda | 116/334 |
| 5,130,548 A | 7/1992 | Sano et al. | 250/461.1 |
| 5,227,767 A | 7/1993 | Tanaka | 340/702 |
| 5,243,194 A | 9/1993 | Sano et al. | 250/461.1 |
| 5,920,150 A | 7/1999 | Crary et al. | 313/484 |
| 6,729,738 B2 | 5/2004 | Fuwausa et al. | 362/84 |
| 6,806,644 B2 * | 10/2004 | Ueno et al. | 313/512 |
| 2002/0186556 A1 | 12/2002 | Wojnarowski | 362/84 |
| 2004/0066644 A1 | 4/2004 | Chang | 362/23 |
| 2004/0189483 A1 | 9/2004 | Stringfellow | 340/815.4 |

* cited by examiner

*Primary Examiner*—Sandra O'Shea
*Assistant Examiner*—Anabel Ton
(74) *Attorney, Agent, or Firm*—Dickinson Wright PLLC

(57) ABSTRACT

An instrument panel assembly (10) having a transparent intermediate substrate (42) inside its housing (16) on which is applied a phosphor coated indicia (40) for giving the appearance of a depth dimension when energized by a UV light source (36). Multiple intermediate substrates (42, 48) can be positioned at different level within the interior region of the housing (16), each containing various indicia (40, 46, 56, 58) which emits luminescent light when irradiated by the UV light source (36). Multiple UV light sources (36, 52) can be set to project UV radiation of different wavelengths into the housing (16) with each of the phosphor coated indicia (40, 46, 56, 58) being selected from material types which are responsive to only one of the various UV wavelengths, so that each indicia (40, 46, 56, 58) can be selectively energized to display warnings, information messages, or the like.

14 Claims, 4 Drawing Sheets

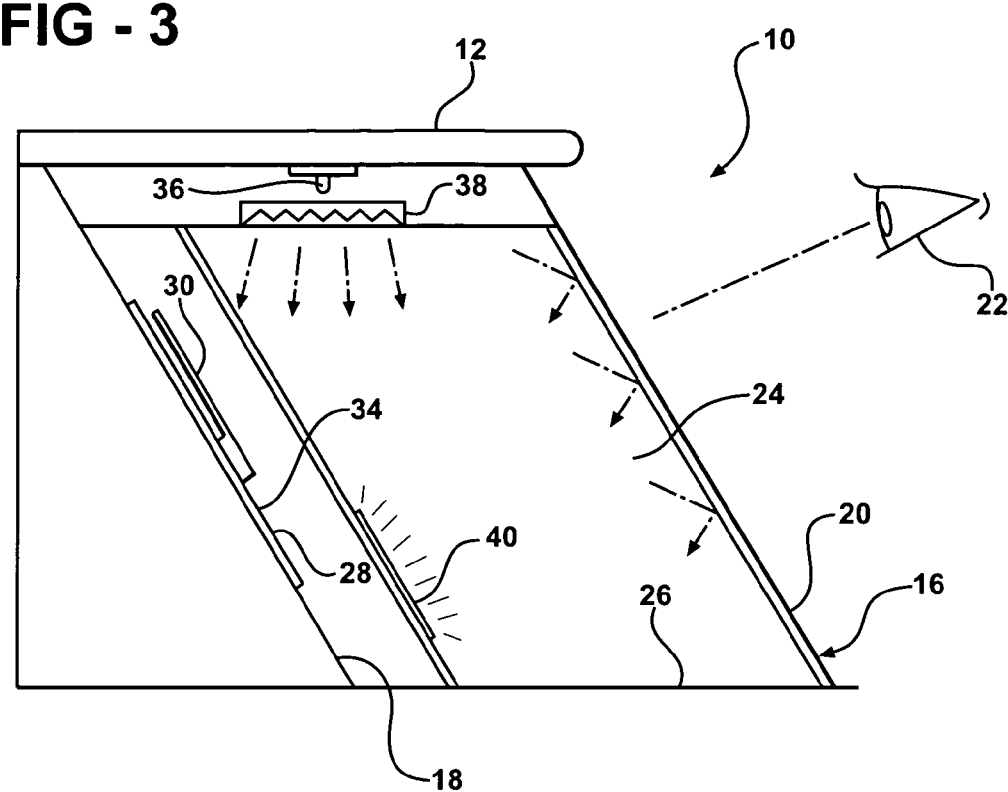
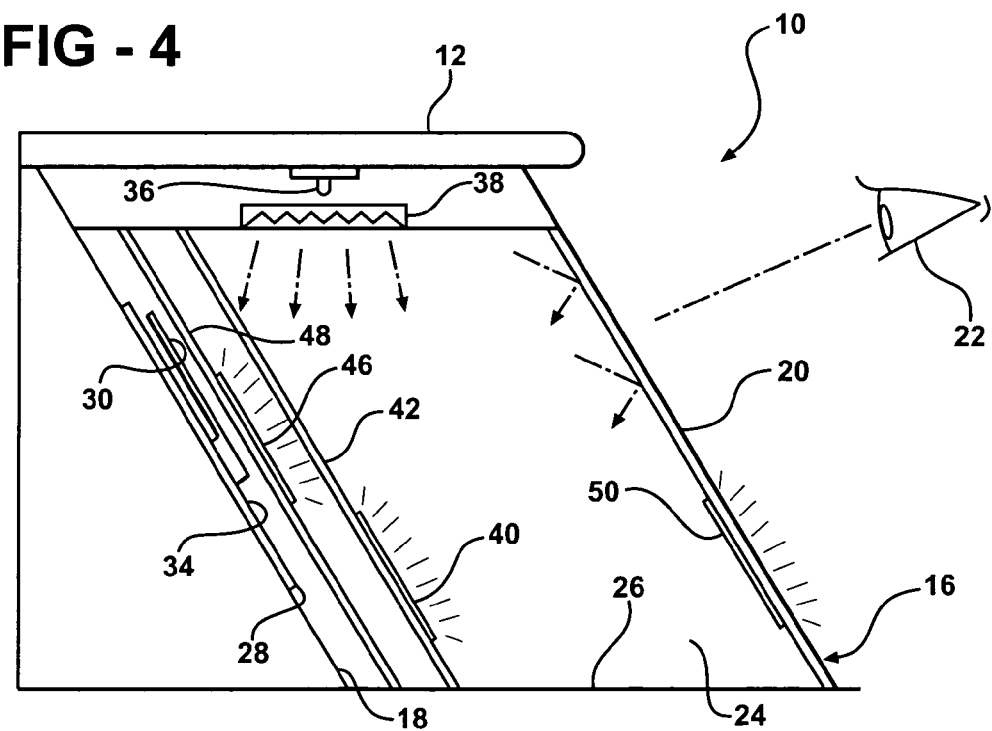

PHOSPHOR REACTIVE INSTRUMENT PANEL AND GAUGES

RELATED APPLICATIONS

This invention claims the benefit of priority to U.S. Provisional Application No. 60/622,307 filed Oct. 26, 2004.

BACKGROUND OF THE INVENTION

1. Field of the Invention

The invention relates to an instrument panel such as used for navigational purposes, and more particularly toward an improved technique for lighting indicia in a vehicle instrument cluster to create an aesthetic dimensional effect.

2. Related Art

The instrument cluster and gauges in a typical motor vehicle must be clearly visible by the operator during all ambient lighting conditions. For example, a driver must be able to clearly read the gauges during bright sunlight as well as during nighttime driving. For this reason, the various colors applied to different components and the lighting or illumination of those components must be adaptable to different conditions. Various illumination techniques, such as incandescent lighting, florescent lighting, and LED lighting have been used to accomplish both daytime and nighttime gauge illumination.

In addition to the functional requirements of visibility placed upon the instrumentation, this area of a vehicle has become a favored target of designers and stylists who attempt to create dazzling and visually impressive presentations. Such impressive stylizations often become a determining factor in a consumer's buying decision.

One such stylistic feature has included the use of phosphor coated indicia within the housing of the instrument cluster which can be selectively energized by an ultraviolet (UV) light source. The phosphor coated indicia presents a different color to an observer when irradiated, than it does in a non-energized state. The resulting instrument cluster can thereby provide an aesthetically appealing display when energized. Examples of prior art instrument panels including phosphor or other UV sensitive indicia may be found in U.S. Pat. No. 5,920,150 to Crary, et al issued Jul. 6, 1999. Other examples may be found in US Publication No. 2002/0186556 to Wojnarowski, published Dec. 12, 2002 and US Publication No. 2004/0189483 to Stringfellow, published Sep. 30, 2004. In all of these examples, UV-irradiated indicia may be located within the confines of an instrument panel housing and selectively energized by the UV light source to develop aesthetically interesting effects.

All of these prior art examples emphasize the attention that is given to the instrument cluster and the general appeal of various lighting effects to generate consumer interest. Accordingly, these prior art underscore the need for functional instrument panels which are both clearly visible to a driver during all lighting conditions and also present unique and stylistically impressive visual displays.

SUMMARY OF THE INVENTION

The invention comprises an instrument panel assembly such as the type which can be used in a motor vehicle. The instrument panel assembly includes a housing having a generally transparent front screen, a backfield, and sidewalls, which together bound an interior region. At least one gauge is fixed to the backfield within the interior region of the housing for communicating information to an observer through the front viewing screen. Phosphor coated indicia is disposed in the interior region for converting UV radiation into emitted luminescent light. A UV light source projects UV light into the interior region of the housing and thereby irradiates the phosphor coated indicia so that it emits luminescent light. An intermediate substrate holds the phosphor coated indicia in spaced relation to the gauge and suspended between the backfield and the viewing screen to provide an aesthetic dimensional effect within the interior region when the phosphor coated indicia emits luminescent light. In other words, the phosphor coated indicia can take the appearance of floating or hovering above the gauge and/or backfield thereby mimicking a somewhat three-dimensional or holographic effect. The end result in an aesthetically interesting visual presentation created when the phosphor coated indicial is irradiated within the instrument panel assembly. Due to the value placed upon dazzling and visually impressive presentations within an instrument panel assembly, particularly those within a motor vehicle, the subject invention offers a technique for meeting a long felt yet unsatisfied need.

BRIEF DESCRIPTION OF THE DRAWINGS

These and other features and advantages of the present invention will become more readily appreciated when considered in connection with the following detailed description and appended drawings, wherein:

FIG. 3 is a simplified cross-sectional view of an instrument panel assembly according to a first embodiment of the invention;

FIG. 4 is a simplified cross-sectional view of a second embodiment including secondary and tertiary phosphor coated indicia within the interior region of the housing;

DETAILED DESCRIPTION OF THE PREFERRED EMBODIMENT

Figure 1:
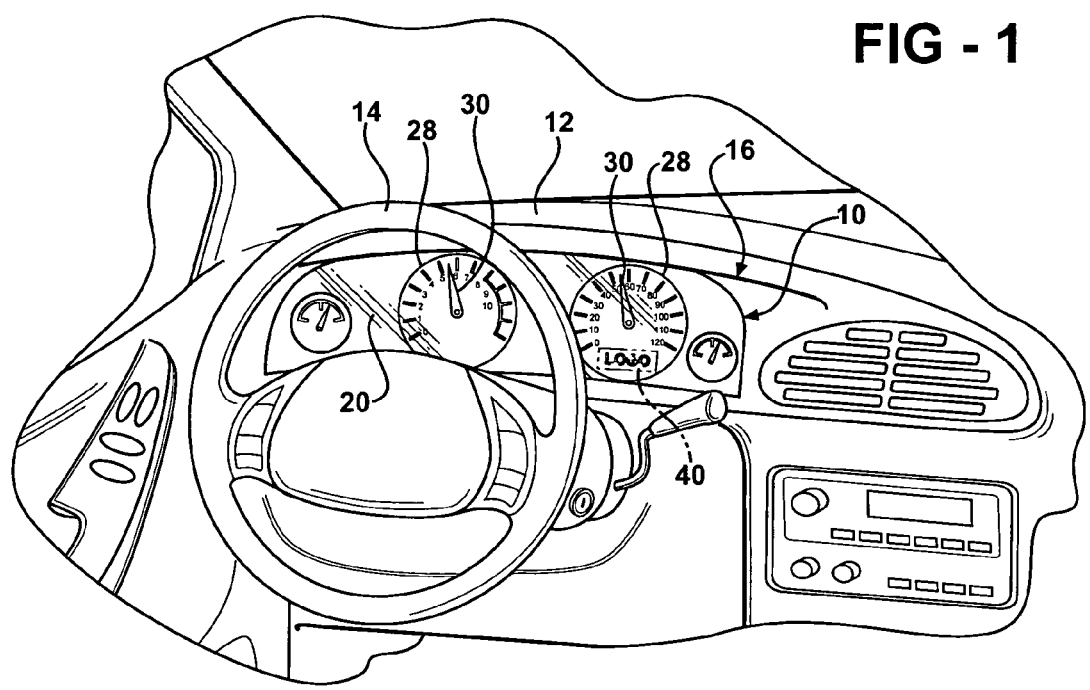
FIG. 1 is a perspective view of a vehicular interior including an instrument panel assembly.

Referring to the Figures, wherein like numerals indicate like or corresponding parts throughout the several views, an instrument panel assembly for communicating information to a observer is generally shown at 10 in FIG. 1. The novel features of this invention are applicable to an instrument panel assembly for any field of use, including machine control, aviation, and the like, but throughout this specification is described in the exemplary setting of a motor vehicle. Thus, the instrument cluster 10 is here shown sheltered below a dashboard 12 and behind a steering wheel 14, which has proven to be an ergonomically convenient location for vehicular applications. When used in applications other than motor vehicles, which other applications are within the scope of this invention, the instrument panel assembly 10 may be set in and among different features altogether.

Figure 2:
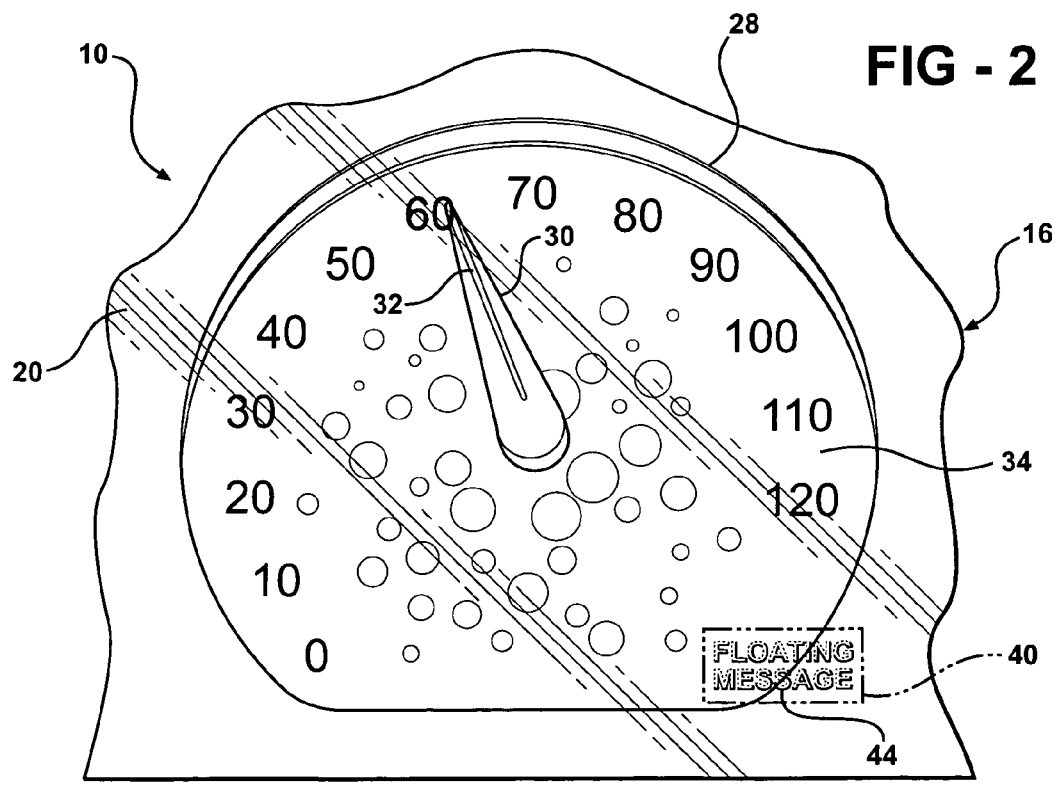
FIG. 2 is a view showing the dimensional effect created by the phosphor coated indicia supported within the instrument panel assembly.

Referring now to FIGS. 2 and 3, the instrument panel assembly 10 is shown in its most basic form including a housing, generally indicated at 16. The housing 16 includes a backfield 18 and a UV absorbing or reflecting front viewing screen 20. Typically, the front viewing screen 20 is made from a clear acrylic material, however, other translucent or transparent materials can be used provided they do not allow UV light to pass through to an observer, such as the driver, represented by an eye 22. The housing 16 also includes sidewalls 24 and a bottom 26 which, together with the backfield 18 and dashboard 12, define an enclosure visible to the observer 22 through the front viewing screen 20. The enclosure is hereinafter referred to as the interior region.

Within the housing 16, supported upon the backfield 18, is provided one or more gauges 28. The gauges 28 may take any known form, including a speedometer, tachometer, display screen, or the like. In the example depicted, the gauge 28 includes a pointer 30, a stripe 32 along the pointer 30, and a patterned gauge field 34. These components may be coated with a phosphor material such as strontium, zinc, cadmium sulfides, or any other material or pigment that absorbs light energy and radiates visible light when exposed to ultraviolet light. Different phosphor materials and blends of materials can be used to radiate different visible light colors. In the example of FIG. 2, during the daytime (unexcited) condition, the gauge field 34 may be generally yellowish in color and the pointer 30 generally black, with the stripe 32 taking a generally white appearance. However, in the irradiated nighttime condition, the visible light radiated from the phosphor coated indicia will change. For example, the gauge field 34 may display a predominantly bluish color with random circles reminiscent of craters seen on a full moon, the pointer 30 a predominantly red color, and the stripe 32 a predominantly yellow color. This change of colors between daytime and nighttime conditions, where the visual impression of the gauge 28 may change from subtly sun-like to moon-like, results in an aesthetically pleasing presentation.

A UV light source 36 can be placed anywhere convenient, but for illustrative purposes is shown suspended from the underside of the dashboard 12 within the housing 16. To prevent any visible light which may be generated by the UV light source 36 from escaping, a filter 38 is positioned in front of the light source 36. In the preferred embodiment, the filter 38 allows only UV light of a predetermined wavelength to pass through. For example, a typical UV light wavelength might be 365 nm. Thus, when energized, the UV light source 36 may produce light within a range of wavelengths, however, the filter 38 will only allow light in the 365 nm (or other selected) wavelength to enter the interior of the housing 16. Once in the housing 16, the filtered UV light irradiates the phosphor coated indicia, which in turn absorbs light energy and then radiates visible light. The UV absorbing (or reflecting) front viewing screen 20, which is generally clear to the observer 22, prevents harmful UV radiation from reaching the observer. Thus, to the observer 22, UV light emitted from the light source 36 is completely undetectable. Nevertheless, the UV light causes the gauge field 34, the pointer 30, and the stripe 32 to glow with different visible light colors. This renders an impressive visual effect.

According to the invention, additional phosphor coated indicia 40 in the form of, for example words or shapes, can be applied inside the housing 16 at locations spaced away from the backfield 18 and from the gauge 28. Preferably, but not necessarily, this technique is carried out in a manner which renders the phosphor coated indicia 40 completely invisible to the human eye during the daytime, or at least not prominent, and to become visible (prominent) during nighttime viewing or when otherwise energized by the UV light source 36. In order to accomplish an interesting dimensional effect, the phosphor coated indicia 40 is supported on an intermediate substrate 42. The intermediate substrate 42 holds the phosphor coated indicia 40 in spaced relation to the gauge 28 and suspended between the backfield 18 and the front viewing screen 20. If the phosphor coated indicia 40 is applied as a very thin coating, and if the intermediate substrate 42 is substantially transparent, the phosphor coated indicia 40 will be nearly invisible to the human eye during daytime or non-energized conditions. However, when energized by the UV light source 36, the phosphor coated indicia 40 will emit luminescent light and the normal depth perception of an observer 22 will appreciate that the phosphor coated indicia appears to hover or float above the gauge 28 and backfield 18. Preferably, although not necessarily, the intermediate substrate 42 comprises a sheet-like plastic material which is fully UV light transmissive. The intermediate substrate 42 may thus cover the entire backfield 18 but be substantially undetectable by the observer due to its transparency. Depending upon the distance between the backfield 18 and the intermediate substrate 42, different visual effects can be achieved, in part by any shadows 44 which may be cast by the energized phosphorus coated indicia 40 upon the backfield 18 and/or the gauge 28, as shown in FIG. 2.

In FIG. 4, an alternative embodiment of the subject invention is depicted including a secondary phosphor coated indicia 46 disposed in the interior region and spaced from the first mentioned phosphor coated indicia 40. The secondary phosphor coated indicia 46 is supported on a secondary intermediate substrate 48 which, like the first mentioned intermediate substrate 42, holds the secondary phosphor coated indicia 46 in spaced relation to the gauge 28 and suspended between the backfield 18 and the viewing screen 20. The first mentioned intermediate substrate 42 and the secondary intermediate substrate 48 may, as depicted, be both manufactured from a similar, substantially transparent sheet-like plastic material which spans the interior region from sidewall 24 to opposing sidewall 24 within the housing 16. It is not required that the substrates 42, 48 be planar members, but rather can have contours such an convex or concave shapes to impart additional dimensional qualities to the perceived image of the phosphor coated indicia 40, 46.

Referring still to FIG. 4, a tertiary phosphor coated indicia 50 can be disposed within the interior region and affixed to the front viewing screen 20. Because it is disposed on the inside surface of the front viewing screen 20, the tertiary phosphor coated indicia 50 can be radiated by the UV light source 36 to emit luminescent light. The result is a multi-dimensional visual effect which is perceived as visually interesting to an observer 22.

Figure 5:
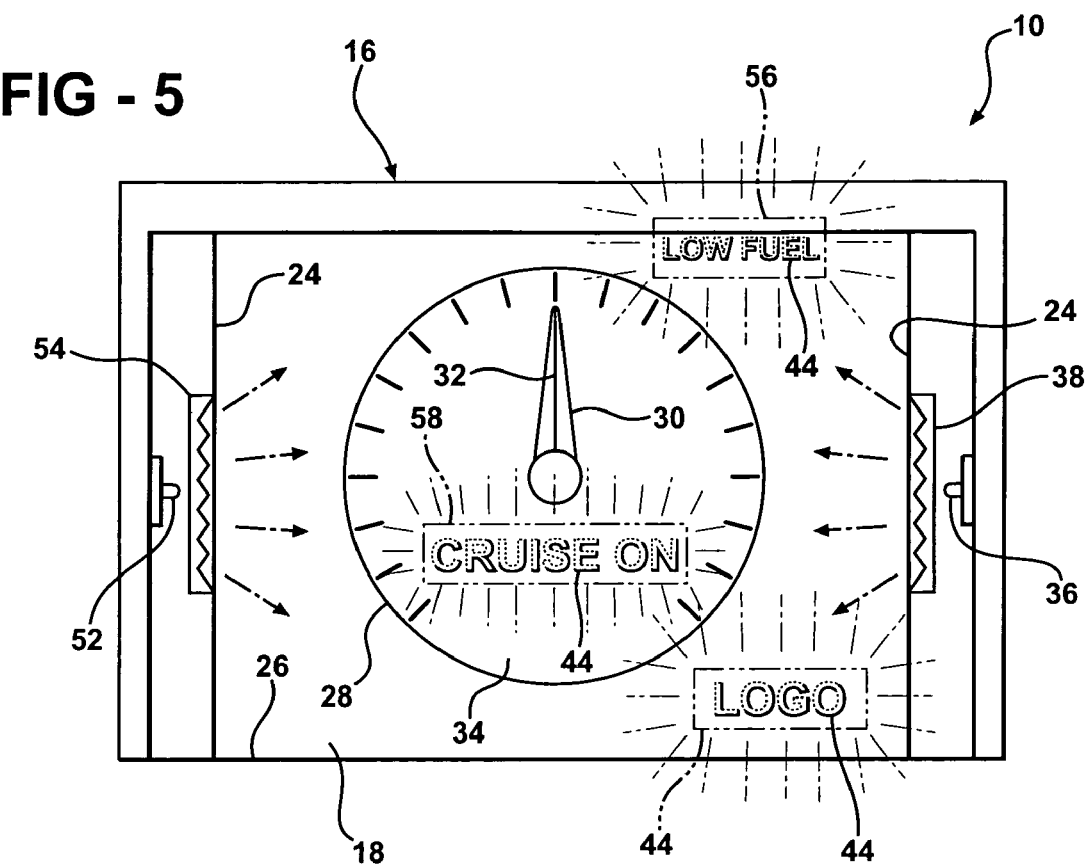
FIG. 5 is a front view of the exemplary embodiment depicted in FIG. 4.

Turning now to FIG. 5, a second alternative embodiment of the subject invention is shown including a second UV light source 52. The second UV light source 52 can be used to increase the amount of UV radiation flooded into the housing 16, or more preferably can be accompanied with a filter 54 which allows a different wavelength of UV energy to flood the housing 16. For example, the first mentioned UV filter 38 may be set to 350 nm, whereas the second UV filter 54 may be set to 385 nm. With this combination, the phosphor coated indicia can be selectively chosen so that phosphor materials react to UV radiation at the 350 nm wavelength are not affected by UV light at the 385 nm wavelength. Although many practical and aesthetic uses of this alternative embodiment will be readily appreciated, one such application energizes the second UV light source 42 only when a predetermined condition occurs. For example, in FIG. 5 a warning indicia 56 which displays the words "LOW FUEL" (as but one example) is visible only when the second UV light source 52 is energized. Thus, in the example, the second UV light source 52 can be operatively coupled to the fuel gauge so that it is energized only when the fuel level falls below a predetermined lower level. In the unexcited state, the warning indicia 56 would be completely transparent (or at least barely noticeable) to the observer 22.

Similarly, another informational indicia 58 might display the words "CRUISE ON" as an example. The informational indicia 58 might be responsive to UV light at the 350 nm wavelength only, and is therefore visible when the first mentioned UV light source 36 is energized, but not when the second UV light source 52 is energized. If both first 36 and second 52 UV light sources are simultaneously energized, then both warning 56 and informational 58 indicia are visible. Similarly, the tertiary phosphor coated indicia 50 which, in FIG. 5 is depicted by the exemplary word "LOGO", may be responsive to a third or tertiary UV light source (not shown) which operates at yet a different wavelength than either of the other two UV light sources 36, 52. As an example, the tertiary phosphor coated indicia 50 may be activated independently from any of the other indicia 56, 58 or in combination therewith. Furthermore, because the warning indicia 56 is sensitive to UV light in a different wavelength from that of the informational indicia 58, they can be supported on the same intermediate substrate or on separate intermediate substrates akin to the embodiment depicted in FIG. 4.

The secondary intermediate substrate 48 can be used in various configurations together with the dual light source embodiment shown in FIG. 5. For example, the secondary intermediate substrate 48 could be made from a UV absorbing material much like the front viewing screen 20, and the dual UV light sources set to operate on different sides of the secondary intermediate substrate 48. In this manner, it is possible to achieve the conditional activation of the various indicia 56, 58 while using UV light sources and filters of the same wavelength. This technique can be applied with any number of intermediate substrates and any number of UV light sources.

Figure 6:
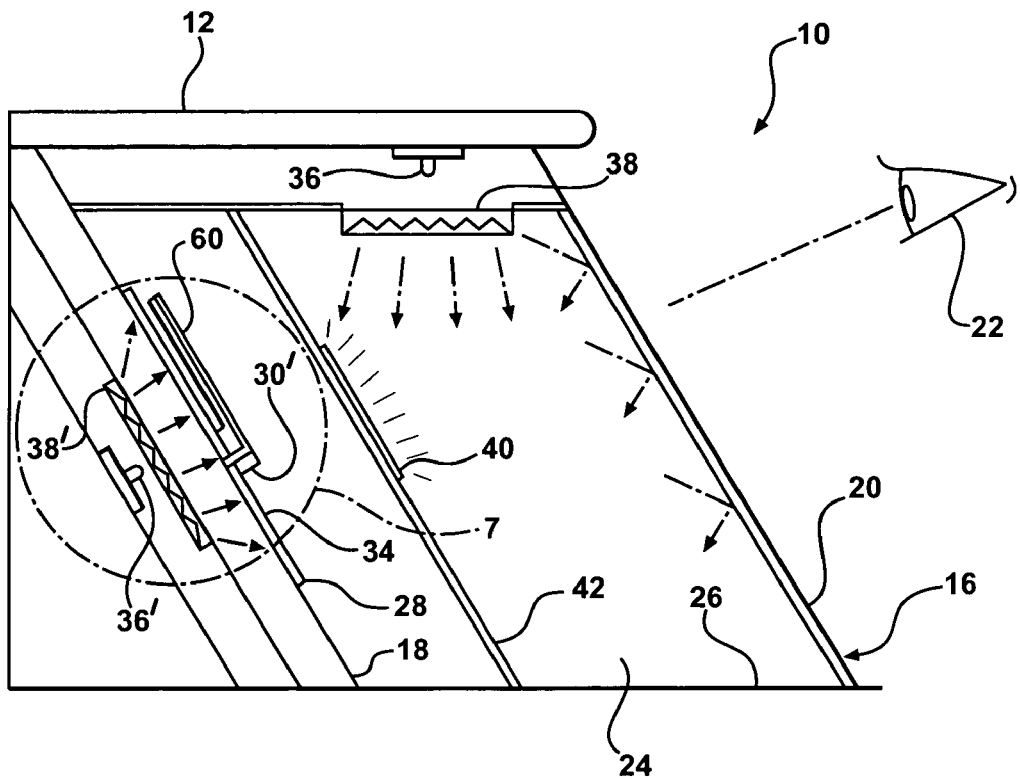
FIG. 6 is a simplified cross-sectional view of a third embodiment of the invention wherein at least one UV light source is projected from a location behind the backfield.
Figure 7:
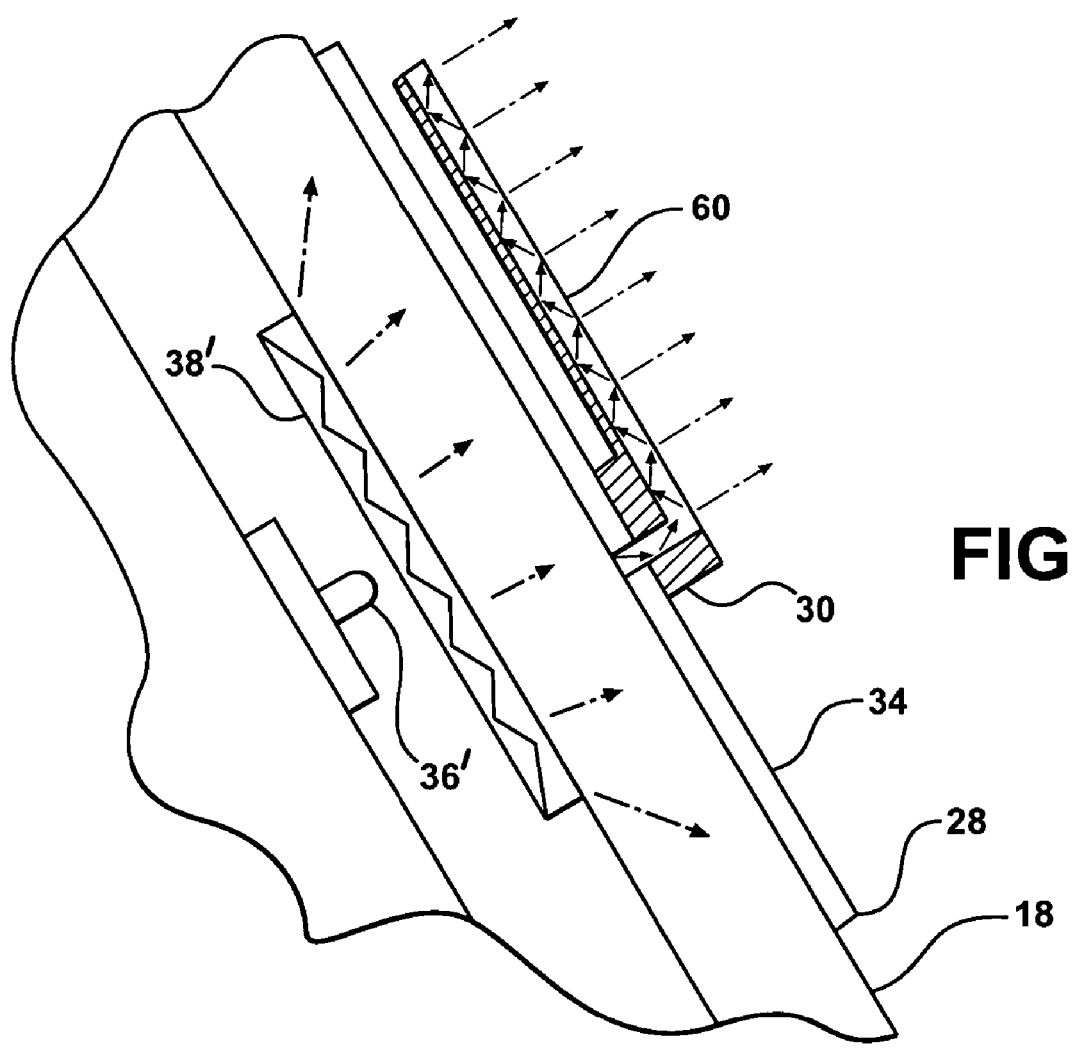
FIG. 7 is an enlarged view of the circumscribed area shown in FIG. 6 showing a waveguide formed in the gauge pointer.

FIGS. 6 and 7 illustrate yet another alternative embodiment of the subject invention, wherein the UV light source 36' is positioned behind the backfield 18. In this embodiment, phosphor deposited in a clear medium is painted or otherwise applied to select surfaces within the interior region. UV light emanating from the light source 36' energizes the phosphor materials within the interior region, or at least those phosphor coated indicia which are responsive to the particular wavelength passing through filter 38'. For indicia features which may be partially or fully eclipsed, such as the pointer 30' is eclipsed by the gauge field 34', various techniques can be employed so that UV light reaches all phosphor surfaces to achieve results similar to that shown in the preceding embodiments. For example, the pointer 30' may be fitted with a wave guide 60 which functions to transmit UV light to the needed surfaces. This concept of backlighting the indicia can be used in conjunction with other embodiments of the invention, including the dual light source embodiment shown in FIG. 5.

Although the phosphor coated indicia 40, 46, 50, 56, 58 has been described almost entirely within the context of the florescent type phosphor, i.e., one which radiates visible light only so long as the UV light source remains energized, the phosphor coated indicia could also be of the phosphorescent type which continues to radiate visible light long after the energy source is discontinued. With phosphorescent type materials, it would be possible to pulse the UV light source 36 instead of maintaining a continuous "ON" condition.

Obviously, many modifications and variations of the present invention are possible in light of the above teachings. It is, therefore, to be understood that within the scope of the appended claims, the invention may be practiced otherwise than as specifically described.

What is claimed is:

1. An instrument panel assembly comprising:
   a housing having a generally transparent front viewing screen, a backfield, and sidewalls together bounding an interior region;
   at least one gauge fixed to said backfield within said interior region operative to communicate information to an observer through said front viewing screen;
   phosphor coated indicia disposed in said interior region operative to convert UV radiation into emitted luminescent light;
   a UV light source operative to project UV light into said interior region of said housing and irradiate said phosphor coated indicia so as to emit luminescent light; and
   an intermediate substrate holding said phosphor coated indicia in spaced relation to said gauge and suspended between said backfield and said viewing screen.

2. The assembly of claim 1 wherein said intermediate substrate is substantially transparent.

3. The assembly of claim 1 wherein said intermediate substrate comprises a sheet-like plastic material extending between opposing sidewalls of said housing.

4. The assembly of claim 1 wherein said front viewing screen prevents the transmission of UV radiation therethrough.

5. The assembly of claim 1 further including a secondary phosphor coated indicia disposed inside said interior region and spaced from said first-mentioned phosphor coated indicia.

6. The assembly of claim 5 further including a secondary intermediate substrate for holding said secondary phosphor coated indicia in spaced relation to said gauge and suspended between said backfield and said viewing screen.

7. The assembly of claim 6 further including a secondary UV light source for projecting UV light of a wavelength different than that of said first-mentioned UV light source, said secondary phosphor coated indicia being responsive to said second UV light source but not said first-mentioned UV light source.

8. The assembly of claim 1 further including a tertiary phosphor coated indicia disposed in said interior region and affixed to said front viewing screen.

9. The assembly of claim 1 wherein said gauge includes a wave guide for transmitting UV light.

10. The assembly of claim 1 further including a UV filter disposed between said UV light source and said interior region of said housing for selectively passing only UV light within a predetermined range of wavelengths into said interior region.

11. A vehicular instrument panel assembly of the type for displaying real time information to a driver, said assembly comprising:

a housing having a generally transparent front viewing screen made from a UV absorbing material, a backfield, and sidewalls together bounding an interior region;

at least one gauge fixed to said backfield within said interior region operative to communicate information to the driver through said front viewing screen;

phosphor coated indicia disposed in said interior region operative to convert UV radiation into emitted luminescent light;

a UV light source operative to be selectively energized and project UV light into said interior region of said housing and irradiate said phosphor coated indicia so as to emit luminescent light; and a substantially transparent intermediate substrate holding said phosphor coated indicia in spaced relation to said gauge and suspended between said backfield and said viewing screen.

12. The assembly of claim 11 further including a UV filter disposed between said UV light source and said interior region of said housing for selectively passing only UV light within a predetermined rage of wavelengths.

13. The assembly of claim 11 further including a secondary phosphor coated indicia disposed in said interior region and spaced from said first-mentioned phosphor coated indicia, and a secondary intermediate substrate for holding said secondary phosphor coated indicia in spaced relation to said gauge and suspended between said backfield and said viewing screen.

14. The assembly of claim 13 further including a second UV light source for projecting UV light of a wavelength different than that of said first-mentioned UV light source, said secondary phosphor coated indicia being responsive to said second UV light source but not said first-mentioned light source.

* * * * *